UNITED STATES PATENT OFFICE.

CARLETON ELLIS, OF LARCHMONT, NEW YORK, ASSIGNOR TO THE CHADELOID CHEMICAL COMPANY, OF NEW YORK, N. Y., A CORPORATION OF WEST VIRGINIA.

PAINT AND VARNISH REMOVER.

985,404.  Specification of Letters Patent.  Patented Feb. 28, 1911.

No Drawing.   Application filed December 27, 1906. Serial No. 349,659.

*To all whom it may concern:*

Be it known that I, CARLETON ELLIS, a citizen of the United States, and now residing at Larchmont, in the county of Westchester and State of New York, have invented certain new and useful Improvements in Paint and Varnish Removers, of which the following is a specification.

This invention relates to paint and varnish removers and relates especially to removers for paint or varnish comprising esters of the hydroxy acids.

The hydroxy acids, such as lactic, tartaric and citric acids, readily form esters with the various alcohols either by merely boiling a mixture of the acid and alcohol or by suitable treatment with dehydrating agents and the resulting esters have valuable solvent powers for varnish resins so that they are suitable for use in removers for paint or varnish. Commercial amyl tartrate produced by heating a mixture of fusel oil and tartaric acid in a reflux condenser apparatus has a somewhat characteristic odor resembling peaches and is a good solvent for many of the harder resins. A number of useful bodies may be similarly derived, for instance, the methyl ester which has a boiling point of 145° C., while the ethyl ester can be cheaply made in several ways, such as by the distillation of calcium lactate with ethyl sodium sulfate. Of course, if the latter ingredient has been prepared from denatured alcohol a correspondingly mixed ester is produced. Another suitable solvent ester is the diethyl ester of tartaric acid which has a boiling point of 280° C. Other esters are amyl lactic ester, the ethyl ester of oxy-butyric acid and also its methyl ester.

Chloral combines with most of the above compounds producing addition products of a powerful solvent character, especially when they are not too viscous. The thicker bodies may, however, be thinned to the desired extent with suitable thinning agents, such as grain or wood alcohol, or loosening solvents of a ketone character, such as acetone, methyl ethyl ketone, oil of acetone, ethyl butyl ketone; various mobile hydrocarbons and also many other loosening solvents, such as various aldehydes may be similarly used. For example, the solvent properties of the diethyl ester of malic acid are developed on dilution with the above thinners. Esters of this character, both in the aliphatic and aromatic series, or their derivatives, such, for instance, as the chloral addition products mentioned may, of course, be combined with various other paint or varnish solvents and other suitable thickening material may be used, such as wood flour, starch, whiting or waxy body which may also by its film-forming properties decrease evaporation under extreme service conditions. An illustrative compostion suitable for general work consists of amyl tartaric ester, 4 parts, turpentine, 4 parts, oil of acetone, 4 parts, and paraffin or ceresin wax, 1 part, these ingredients being suitably combined and thoroughly incorporated, preferably under gentle heat, although in some instances the wax may be omitted from this remover where high consistency is not desired. Another illustrative composition which may be similarly compounded and which is suitable for removing shellac finish may comprise amyl lactic ester 16 parts, methyl ethyl ketone 16 parts, denatured alcohol 20 parts, amyl acetate 8 parts, fullers' earth 8 parts, Japan wax 2 parts, and sodium stearate 1 part, although under some circumstances the waxy bodies mentioned and also the other thickening material may be omitted.

This invention has been described in connection with a number of illustrative ingredients, formulas, proportions and processes, to the details of which disclosure the invention is not, of course, to be limited.

What is claimed is:—

1. The remover for paint or varnish comprising about 4 parts of amyl tartaric ester, about 4 parts of turpentine, about 4 parts of oil of acetone and about 1 part of wax.

2. The remover for paint or varnish comprising approximately 4 parts of amyl tartaric ester, 4 parts of terpene solvent material, 4 parts of ketonic solvent material and waxy thickening material.

3. The remover for paint or varnish comprising an ester of a hydroxy acid combined with thinning material comprising oil of acetone and with a waxy body.

4. The remover for paint or varnish comprising approximately equal parts of an ester of a hydroxy acid, turpentine and oil of acetone combined with evaporation-retarding stiffening material.

5. The remover for paint or varnish comprising a finish solvent ester of a hydroxy acid combined with thinning finish solvent material and waxy evaporation-retarding material.

6. The substantially fluent remover for paint or varnish comprising approximately equal parts of an ester of a hydroxy acid, a hydrocarbon solvent, ketonic solvent material and waxy thickening material.

7. The substantially fluent remover for paint or varnish comprising substantially equal parts of esteric derivative of a hydroxy acid, a terpene solvent and loosening solvent material in which is incorporated waxy evaporation-retarding material.

8. The substantially fluent remover for paint or varnish comprising an esteric derivative of a hydroxy acid combined with finish solvent thinning material including oil of acetone and with waxy evaporation-retarding material.

CARLETON ELLIS.

Witnesses:
 HARRY L. DUNCAN,
 JESSIE B. KAY.